INVENTOR
JOSEPH ARTHUR MARTIN
BY
ATTORNEY

Patented Sept. 29, 1953

2,653,513

UNITED STATES PATENT OFFICE 2,653,513

OPHTHALMIC MOUNTING

Joseph Arthur Martin, Nicolet, Quebec, Canada, assignor to American Optical Company, Southbridge, Mass., a voluntary association of Massachusetts Application April 7, 1950, Serial No. 154,613

2 Claims. (Cl. 88—47)

This invention relates to improvements in semi-rimless type ophthalmic mountings and has particular reference to an improved construction of mounting of this nature.

One of the principal objects of the invention is to provide a semi-rimless ophthalmic mounting with novel means of connecting the lenses with the supporting structure of the mounting.

Another object is to provide a mounting of the above character wherein the major portion of the lens supporting structure is formed of non-metallic material and, when in position of use on the face of the wearer, is located above the useful field of vision and novel means of supporting and retaining lenses in assembled relation therewith.

Other objects and advantages of the invention will become apparent from the following description taken in connection with the accompanying drawings and it will be apparent that many changes may be made in the details of construction and arrangement of parts shown and described without departing from the spirit of the invention as expressed in the accompanying claims. It, therefore is not intended that the invention be limited to the specific details of construction and arrangement of parts shown and described as the preferred form only has been given by way of illustration.

Referring to the drawings.

Figure 1:
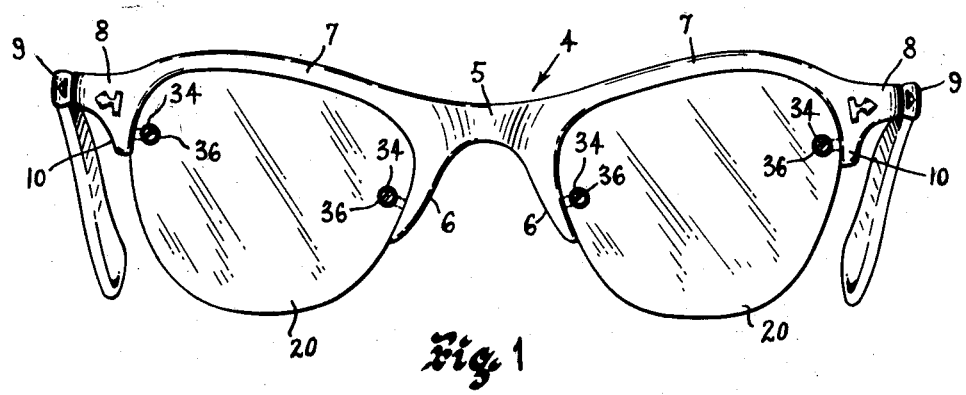
Fig. 1 is a front elevational view of an ophthalmic mounting embodying the invention.

Referring more particularly to the drawings wherein like characters of reference designate like parts throughout the several views, the device embodying the invention comprises a lens supporting structure 4 embodying a central bridge portion 5 having depending side portions 6 and long and slender portions 7 extending outwardly of the opposed sides of the bridge portion 5 and shaped substantially to follow the upper contour shape of the lenses. The portions 7, adjacent the outer ends thereof, terminate in end pieces 8 to which suitable temples 9 are pivotally connected. The said portions 8 are each provided with a downwardly extending portion 10.

The end pieces 8 each have a hinge member 11 secured thereto as by suitable rivets or the like 12 and the temples 9 each have a hinge member 13 secured thereto as by rivets or the like 14. The said hinge members are pivotally connected with each other by a screw or the like 15 having a threaded end portion 16 adapted to be threaded within the threaded bore 17 formed in one of the hinge ears of the hinge member 13.

Figure 2:
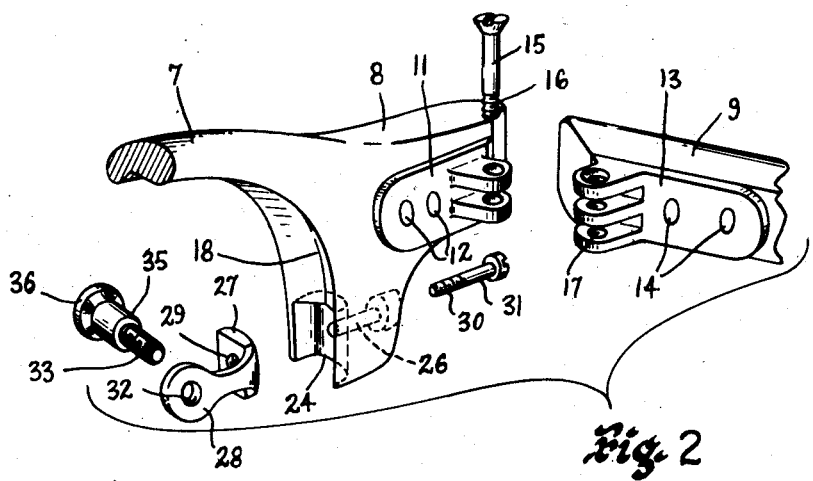
Fig. 2 is an enlarged fragmentary perspective view showing the parts in disassociated relation with each other.
Figure 3:
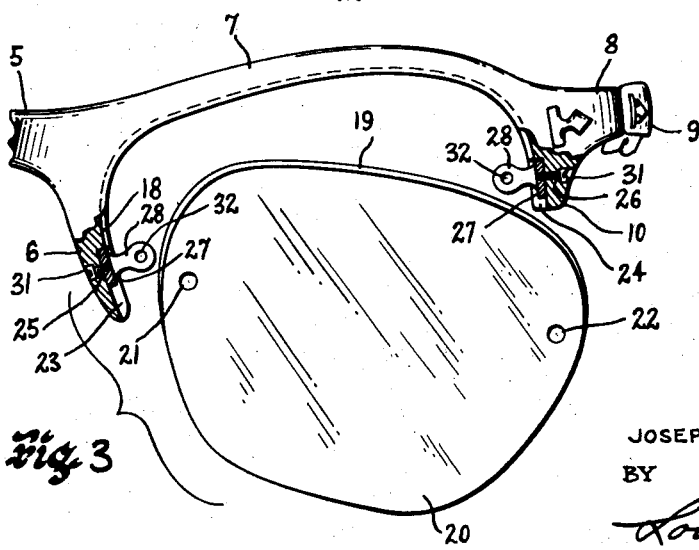
Fig. 3 is a fragmentary front elevational view of the supporting structure having portions thereof in section and showing the lens disassociated therewith.

The long and slender portions 7 and the respective depending portions 6 and 10 are provided with a continuous inner beveled groove 18, as shown best in Figs. 2 and 3, and adapted to receive the upper beveled edge 19 of the lens 20. The said lens 20 is provided on the nasal and temporal sides thereof with connection openings 21 and 22 and the bevel 19 extends preferably throughout the upper edge of the lens to a point adjacent the respective openings 21 and 22 wherein the remainder of the lens is provided with a relatively flat edge surface.

The respective depending portions 6 and 10 are each provided with a notched area 23 and 24 which respectively communicate with the inner bevel or V-groove 18 and the said portions 6 and 10 are each provided with an opening 25 and 26 communicating with the respective notches 23 and 24. The respective notched portions 23 and 24 are adapted to receive the base 27 of lens connection means having an integral ear 28 thereon. The said base 27 is provided with a threaded opening 29 adapted to receive the threaded end 30 of a connection screw 31 whereby the said base 27 is secured in the notched area 24 or 23, as the case may be. The said connection screw 31 is adapted to extend through the opening 26 or 25 and, when threaded inwardly of the threaded opening 29, firmly secures the lens connection means to the respective depending portions 6 and 10, see Figs. 2 and 3. The respective ear members 28 are provided with a threaded opening 32 for receiving the threaded end 33 of a connection screw 34 by which the lens 20 may be secured to the ears 28. The connection screws 34 are provided with a sleeve 35 preferably of plastic material and adapted to fit within the respective connection openings 21 and 22 in the lenses and are also provided with a washer-like member 36 which is adapted to straddle the said connection openings and engage the lens at a location spaced from the contour edge of the respective openings. The washers 36 are preferably provided with a counterbore for receiving the respective heads of the connection screws 34.

Although it has been specified that the long and slender portions 7 and depending portions 6 and 10 are provided with an inner V-shaped beveled groove, it is to be understood that said portions may be provided with an inner relatively flat surface, in which instance the upper edge of the lens, which has been specified as being beveled, would be formed relatively flat in a direction normal to the plane of the lens.

The arrangement is such, however, that the parts may be quickly and easily assembled with each other and the lenses rigidly held in assembled relation with the supporting structure with maximum ease as to interchanging or replacing of the lenses.

It is particularly pointed out that the depth of the notches 23 and 24 respectively and the thickness of the base portions 27 are so controlled that the opposed side surface of said base portions are substantially flush with the adjacent surface of the groove 18.

Although the base portion is shown and described as having a threaded opening 29 therein and is described as being secured to the depending portions as by screw member 31, it is to be understood that any suitable means such as a pin, rivet or the like might be used to secure said member in its respective notch. This also applies to the connection means 33 which may be of any of the known commercial types.

It is also to be noted that the notches 23 and 24 are located adjacent the ends of said depending portions 6 and 10 and that the groove 18 communicates therewith as do the openings 26 in said depending portions for the connection means 31.

From the foregoing, it will be seen that simple, efficient and economical means and method have been provided for accomplishing all of the objects and advantages of the invention.

Having described my invention, I claim:

1. In a supporting structure for the lenses of an ophthalmic mounting, the combination of a bridge having a pair of long and slender bar-like members disposed on opposed sides thereof and joined to said bridge, said long and slender bar-like members being formed of non-metallic plastic material and including a nasal depending portion extending below the location at which the bridge is joined with said members to follow the nasal contour of the lenses to be assembled therewith and having a further portion extending outwardly from said location to follow the upper contour of said lenses and terminating in temple connection bearing end portions, said nasal depending portions and temple connection bearing portions of the bar-like members each having a relatively wide and shallow recess in the lens-edge directed side thereof, the intermediate portion of said bar-like members having a lens edge receiving surface extending longitudinally thereof on said lens edge directed side and communicating with said recesses, said portions having the recesses therein further having an opening extending from said recesses to the outer opposed side of the bar-like members and lying substantially in and parallel with the general plane defined by a line drawn centrally and longitudinally of said lens edge receiving surface, and metal L-shaped lens connection members each having a base portion fitted in a respective one of said recesses with its outer exposed surface nearly flush with the said surface and further having a lens strap portion extending from one side of said base portion at approximately right angles thereto to overlie the surface of a respective lens and means for connecting said lens to the strap portions, said base portion of the lens connection members further having an opening therein aligned with said opening in the respective recessed portion of the bar-like members, and metal pin-like securing members including a headed end portion overlying the outer surface of said recessed portions opposite their lens edge directed side and having a shank extended through said aligned openings and their opposed end affixed to the base portion whereby said pin-like members will lie in and be substantially parallel with the general plane in which the lenses are to be supported to cause the connection of the lenses to the supporting structure not only to be located at the most stable point but also to provide long bearing resistance to any attempted lateral displacement of the lenses so that a positive non-loosening connection of the lens connection members with said supporting structure may be had.

2. In a supporting structure for the lenses of an ophthalmic mounting, the combination of a bridge having a pair of long and slender bar-like members disposed on opposed sides thereof and joined to said bridge, said long and slender bar-like members being formed on non-metallic plastic material and including a nasal depending portion extending below the location at which the bridge is joined with said members to follow the nasal contour of the lenses to be assembled therewith and having a further portion extending outwardly from said location to follow the upper contour of said lenses and terminating in temple connection bearing end portions, said nasal depending portions and temple connection bearing portions of the bar-like members each having a relatively wide and shallow recess in the lens-edge directed side thereof, the intermediate portion of said bar-like members having a lens edge receiving groove extending longitudinally thereof on said lens edge directed side and communicating with said recesses, said portions having the recesses therein further having an opening extending from said recesses to the outer exposed side of the bar-like members and lying substantially in and parallel with the general plane defined by the center of said groove, and metal L-shaped lens connection members each having a base portion fitted in a respective one of said recesses with its outer exposed surface nearly flush with the base of said groove, and further having a lens strap portion extending from one side of said base portion at approximately right angles thereto to overlie the surface of a respective lens and means for connecting said lens to the strap portions, said base portion of the lens connection members further having an opening therein aligned with said opening in the respective recessed portion of the bar-like members, and metal pin-like securing members including a headed end portion overlying the outer surface of said recessed portions opposite their lens edge directed side and having a shank extended through said aligned openings and their opposed end affixed to the base portion whereby said pin-like members will lie in and be substantially parallel with the general plane in which the lenses are to be supported to cause the connection of the lenses to the supporting structure not only to be located at the most stable point but also to provide long bearing resistance to any attempted lateral displacement of the lenses so that a positive non-loosening connection of the lens connection members with said supporting structure may be had.

JOSEPH ARTHUR MARTIN.

References Cited in the file of this patent

UNITED STATES PATENTS

| Number | Name | Date |
|---|---|---|
| 782,287 | Stevens | Feb. 14, 1905 |
| 2,239,575 | Schwab | Apr. 22, 1941 |
| 2,463,956 | Ellestad | Mar. 8, 1949 |
| 2,553,181 | Gagnon | May 15, 1951 |
| 2,562,750 | Splaine | July 31, 1951 |

FOREIGN PATENTS

| Number | Country | Date |
|---|---|---|
| 608,081 | Great Britain | Sept. 9, 1948 |